(12) United States Patent
Xu et al.

(10) Patent No.: US 12,548,546 B2
(45) Date of Patent: Feb. 10, 2026

(54) DEVICES, METHODS, SYSTEMS, AND MEDIA FOR SPATIAL PERCEPTION ASSISTED NOISE IDENTIFICATION AND CANCELLATION

(71) Applicant: Huawei Technologies Co., Ltd., Shenzhen (CN)

(72) Inventors: Qiang Xu, Richmond Hill (CA); Vijaya Krishna Mulpuri, Aurora (CA); Xuan Zhou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 341 days.

(21) Appl. No.: 18/463,768

(22) Filed: Sep. 8, 2023

(65) Prior Publication Data

US 2023/0419943 A1 Dec. 28, 2023

Related U.S. Application Data

(63) Continuation of application No. PCT/CN2021/080003, filed on Mar. 10, 2021.

(51) Int. Cl.
*G10K 11/178* (2006.01)
*G06F 3/16* (2006.01)

(52) U.S. Cl.
CPC ........ *G10K 11/17827* (2018.01); *G06F 3/165* (2013.01); *G10K 11/17823* (2018.01);
(Continued)

(58) Field of Classification Search
CPC ....... G10K 11/17827; G10K 11/17823; G10K 11/17881; G10K 2210/3016;
(Continued)

(56) References Cited

U.S. PATENT DOCUMENTS 5,126,681 A 6/1992 Ziegler, Jr.
8,040,937 B2 10/2011 Michaels
(Continued)

FOREIGN PATENT DOCUMENTS

CN 108847250 A 11/2018
CN 110366066 A 10/2019
WO 2017058192 A1 4/2017

OTHER PUBLICATIONS

Shen, Sheng, et al. "MUTE: bringing IoT to noise cancellation." Proceedings of the 2018 Conference of the ACM Special Interest Group on Data Communication 2018.
(Continued)

*Primary Examiner* — David L Ton

(57) ABSTRACT

Devices, methods, systems, and media for selectively cancelling sounds at a listener's location are described. Sound sources are identified in the listener's environment using microphones and/or remote devices associated with specific sound sources. A user is presented with information identifying the sound sources, including spatial information, and prompting the user to select one or more of the sound sources. After the user designates a sound source as noise, microphones are used to monitor for sound originating from the designated sound source, and the audio information captured by the microphones is processed to generate an anti-noise signal presented to the listener to cancel sounds originating from the selected sound source. A user may designate multiple sound sources as noise and leave other sound sources unfiltered. The techniques may be used in single-listener and multi-listener applications, and in listening and speaking applications.

20 Claims, 11 Drawing Sheets

(52) U.S. Cl.
CPC .................. *G10K 11/17881* (2018.01); *G10K 2210/3016* (2013.01); *G10K 2210/3026* (2013.01); *G10K 2210/3027* (2013.01); *G10K 2210/3044* (2013.01); *G10K 2210/3215* (2013.01)

(58) Field of Classification Search
CPC ... G10K 2210/3026; G10K 2210/3027; G10K 2210/3044; G10K 2210/3215; G06F 3/165
See application file for complete search history.

(56) References Cited

U.S. PATENT DOCUMENTS

| | | |
|---|---|---|
| 2014/0098240 A1 | 4/2014 | Dimitriadis |
| 2014/0369506 A1* | 12/2014 | Arrasvuori ............ G01S 3/8083 381/17 |
| 2019/0069080 A1 | 2/2019 | Abrams et al. |
| 2019/0139530 A1* | 5/2019 | Jarvinen .......... G10K 11/17837 |
| 2021/0027758 A1* | 1/2021 | Tsuchiya ................ G10K 11/16 |
| 2021/0397407 A1* | 12/2021 | Eubank ............ G10K 11/17885 |
| 2022/0030349 A1* | 1/2022 | Li ........................ H04R 1/1041 |
| 2022/0159403 A1* | 5/2022 | Sporer .................... H04S 7/302 |

OTHER PUBLICATIONS

Muzo at https://www.celestialtribe.com (https://web.archive.org/web/20191209025636/https://www.celestialtribe.com/) Dec. 9, 2019.
Active Noise Cancellation: https://en.wikipedia.org/wiki/Active_noise_control May 31, 2006.
International Search Report of PCT/CN2021/080003 (WO2022188065) Sep. 15, 2022.

* cited by examiner

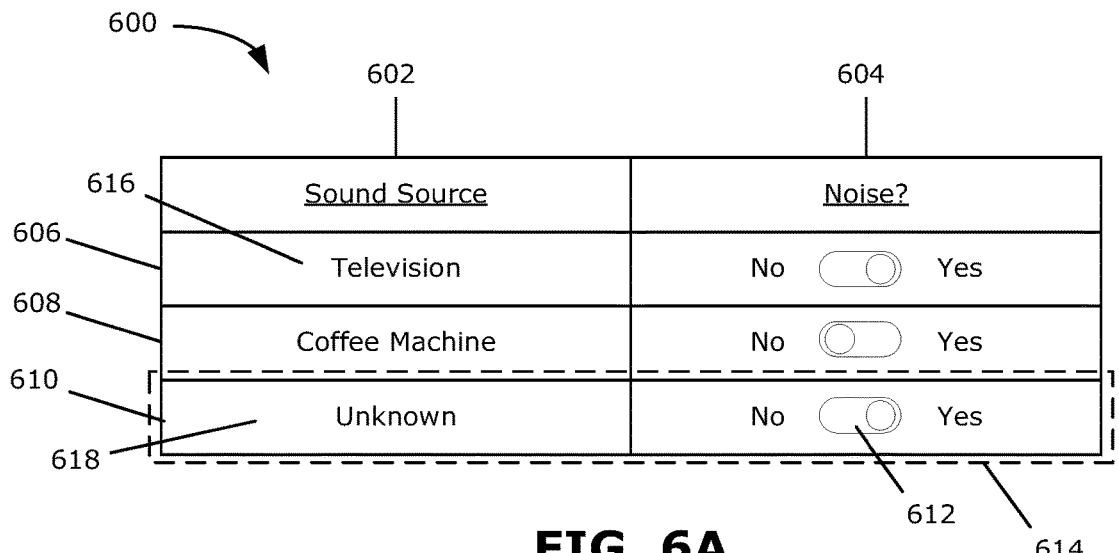
FIG. 6A
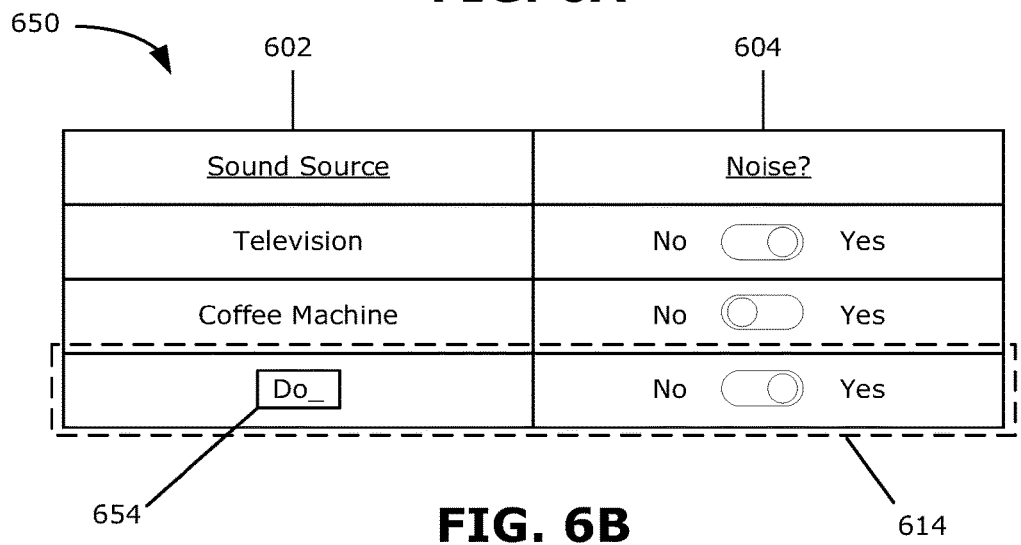
FIG. 6B
| Sound Source ID | Description | Designated for Cancellation | Direction |
|---|---|---|---|
| 0102 | Television | Yes | 110° |
| 0046 | Coffee Machine | No | 290° |
| 0134 | Dog | Yes | 30° |
FIG. 6C

DEVICES, METHODS, SYSTEMS, AND MEDIA FOR SPATIAL PERCEPTION ASSISTED NOISE IDENTIFICATION AND CANCELLATION

CROSS-REFERENCE TO RELATED APPLICATIONS

This application is a continuation of PCT/CN2021/080003 filed on Mar. 10, 2021, the entire contents of which are incorporated herein by reference.

FIELD

The present application generally relates to active noise cancellation, and in particular to devices, methods, systems, and media for noise identification and active noise cancellation assisted by spatial perception.

BACKGROUND

Noise control, or noise cancellation (NC), is a set of techniques used to reduce noise in an environment. Noise is defined as unwanted sound, typically defined with respect to a listener or type of listener (e.g. humans), or to an intended activity (such as generating a sound recording of a musical performance or oral presentation intended to be heard by human listeners). Noise cancellation techniques using sound-absorbing materials to insulate against noise are termed passive noise control, whereas techniques that reduce unwanted sounds by the generation of a second sound (called anti-noise) that cancels the unwanted sounds are referred to as active noise cancellation or active noise control (ANC).

NC techniques may classify noises into four categories: continuous noises, which are produced continuously (for example, a busy street or machinery running in the background); intermittent noises, which periodically increase and decrease (for example, equipment operating in cycles); impulsive noises, which occur sporadically without a predictable cycle (e.g. building construction, or demolition using explosives); and low-frequency noises with frequency in the range 10 Hz-200 Hz. Human audible frequency range is typically between 20 Hz and 20,000 Hz; however, a small portion of the population can hear sounds with frequencies as low as 10 Hz. Thus, for example, the chirping sound produced by refrigerators falls within the low end of the human audible frequency range and is audible only at night, and only by certain people. These low-frequency sounds are typically unpleasant to human listeners who can hear them.

ANC strategies and models have been developed to cancel or reduce continuous noises, and even intermittent noises, in real-time. These existing approaches typically allow users to choose between noisy or noise-free environments: if a noise-free environment is selected, a microphone may be used to detect environmental noises, and an anti-noise signal corresponding to continuous and/or intermittent environmental noises is generated and presented to the user at the same time as the continuous and/or intermittent environmental noises being cancelled. However, such approaches are typically limited to cancellation of continuous and/or intermittent noises, and they are all-or-nothing: the user must elect to cancel all environmental noises or no environmental noises.

Other ANC approaches have attempted to use remote microphones to enable cancellation of impulsive noises. Shen, Sheng, et al, "MUTE: bringing IoT to noise cancellation", Proceedings of the 2018 Conference of the ACM Special Interest Group on Data Communication, 2018 (hereinafter "MUTE") describes an Internet of Things (IoT) approach to ANC using multiple distributed microphones in communication with a listener's audio device. The audio information collected from the distributed microphones enables a look-ahead strategy whereby incoming noises detected by the microphones are cancelled by an anti-noise signal generated at the listener's audio device, timed to cancel the noises detected by the remote microphones based on their respective distances from the listener.

Other ANC approaches have been proposed to selectively cancel noise using in-wire noise signal cancellation (e.g. U.S. Pat. No. 5,126,681 to Ziegler Jr, Eldon W., and John W. Gardner, entitled "In-wire selective active cancellation system", issued 30 Jun. 1992) or spectrum-based noise cancellation (e.g. U.S. Pat. No. 8,040,937 to Michaels, Alan J., entitled "Selective noise cancellation of a spread spectrum signal", issued 18 Oct. 2011).

There thus exists a need for active noise cancellation techniques that overcome one or more of the limitations of existing approaches described above.

SUMMARY

The present disclosure describes devices, methods, systems, and media for selectively cancelling sounds at a listener's location. Multiple sound sources are identified in the listener's environment using some combination of microphones and/or remote devices associated with specific sound sources. A user is presented with information identifying the sound sources and prompting the user to select one or more of the sound sources. After the user selects a sound source for cancellation, one or more microphones are used to monitor for sound originating from the sounds sources selected for cancellation, and the audio information captured by the microphones is processed to generate an anti-noise signal presented to the listener to cancel the sounds originating from the selected sound sources.

Existing approaches to active noise cancellation, such as the system described in MUTE, do not distinguish between sounds originating at different sources, and do not provide a mechanism by which a user might choose to selectively cancel one noise and not another noise in the environment. Other existing techniques cancel a specific noise component by selecting signal properties such as frequency or spectrum, without identifying a correspondence between these signal properties and specific sound sources that would enable a user to understand or make meaningful choices with respect to said selective noise cancellation. By providing the user with a user interface that identifies and locates sound sources spatially, example embodiments described herein may facilitate greater user control in designating and de-designating various sound sources as noise. The described embodiments may exhibit one or more advantages over existing approaches. Sound sources in the environment may be identified and decoupled using spatial perception capabilities of one or more microphones. Users may be provided with an easier way to classify different sound sources as noise without requiring the user to manipulate signal characteristics such as frequency and wavelength. A user-friendly graphical user interface may be provided that associates sound sources with human-readable descriptions and intuitive spatial information (such as identification of the direction of the sound source relative to the user). The use of intuitive spatial information to identify sound sources also enables users to designate a sound source as noise by using an intuitive gesture system, e.g., by pointing a mobile phone or other handheld device in the direction of the noise originating from a sound source.

As used in this disclosure, the term "noise" refers to sound that a user deems undesirable.

As used in this disclosure, the term "user" refers to a person interacting with an interactive device or system. The term "listener" refers to a person or device capable of perceiving or capturing sound, such as a human listener or a recording microphone. In some examples, the user of a system or device described herein may also be the listener. The term "listener location" refers to a point or region of space localized to a listener. In different examples and use cases, a listener location may be as small as the recording surface of a microphone or the ear canal of a listener wearing earbuds, or may be as large as a conference room, as long as the acoustic environment is relatively homogenous across the listener location with respect to the sound sources being cancelled. As sounds travel through space from different originating sound sources, they arrive at different locations at different times relative to each other; furthermore, the sound vibrations may be affected by different physical structure or forces differently at different points in their trajectories, such that the signal characteristics of a sound may differ when it arrives at one location as opposed to another. Accordingly, sounds from multiple sources may have different timing and other signal characteristics when they arrive at a given location, such as a listener location, and these characteristics must be taken into account when attempting to cancel noise from one or more of the sound sources.

In some aspects, the present disclosure describes a method for selectively cancelling sounds at a listener's location. Sound source user output is generated, identifying a plurality of sound sources. A user input is processed to designate a selected sound source of the plurality of sound sources as a noise source. Sound source audio information corresponding to sound originating from one or more sound sources of the plurality of sound sources is processed. The one or more sound sources includes the noise source. The sound source audio information is processed to generate a noise cancellation signal configured to cancel, at the listener's location, sound originating from the noise source. An audio output signal based on the noise cancellation signal is sent to an audio output device for presentation to the listener.

In some aspects, the present disclosure describes a system for selectively cancelling sounds at a listener's location. The system comprises a processor device, and a memory storing machine-executable instructions thereon. The machine-executable instructions, when executed by the processing device, cause the system to perform a number of steps. Sound source user output is generated, identifying a plurality of sound sources. A user input is processed to designate a selected sound source of the plurality of sound sources as a noise source. Sound source audio information corresponding to sound originating from one or more sound sources of the plurality of sound sources is processed. The one or more sound sources includes the noise source. The sound source audio information is processed to generate a noise cancellation signal configured to cancel, at the listener's location, sound originating from the noise source. An audio output signal based on the noise cancellation signal is sent to an audio output device for presentation to the listener.

In some examples, the sound source user output comprises, for each sound source of the plurality of sound sources, location information associated with the sound source. The sound source user output is sent to a user output device. The user input is received from a user input device.

In some examples, the location information comprises a direction of the sound source.

In some examples, processing the user input to designate a selected sound source of sound sources as a noise source comprises: receiving directional information from a pointing device indicating a pointing direction, receiving sound source designation information from the user input device, and processing the directional information and the sound source designation information to designate a selected sound source as a noise source based on the direction of the selected sound source.

In some examples, the method further comprises receiving, from a remote device, remotely monitored sound source information with respect to a remotely monitored sound source of the plurality of sound sources, and wherein the sound source user output identifies the remotely monitored sound source.

In some examples, the sound source audio information comprises remotely monitored sound source audio information received from the remote device corresponding to sound originating from the remotely monitored sound source.

In some examples, the remotely monitored sound source information comprises remotely monitored sound source location data, and further comprising processing the remotely monitored sound source location data to generate the location information associated with the remotely monitored sound source.

In some examples, the method further comprises receiving, from a microphone, environmental audio information comprising sound originating from an unmonitored sound source of the plurality of sound sources. The sound source user output identifies the unmonitored sound source.

In some examples, the method further comprises processing the environmental audio information to generate the location information associated with the unmonitored sound source.

In some examples, the system further comprises a supplementary device comprising the user input device and the user output device. The user input device comprises a pointing device. Processing the user input to designate a selected sound source of the plurality of sound sources as a noise source comprises: receiving directional information from the pointing device indicating a pointing direction, receiving sound source designation information from the user input device, and processing the directional information and the sound source designation information to designate a selected sound source as a noise source based on the direction of the selected sound source.

In some examples, the machine-executable instructions, when executed by the processing device, further cause the system to receive, from a remote device, remotely monitored sound source information with respect to a remotely monitored sound source of the plurality of sound sources, and the sound source user output identifies the remotely monitored sound source.

In some examples, the remotely monitored sound source information comprises remotely monitored sound source location data. The machine-executable instructions, when executed by the processing device, further cause the system to process the remotely monitored sound source location data to generate the location information associated with the remotely monitored sound source.

In some examples, the machine-executable instructions, when executed by the processing device, further cause the system to receive, from a microphone, environmental audio information comprising sound originating from an unmonitored sound source of the plurality of sound sources, and the sound source user output identifies the unmonitored sound source.

In some examples, the machine-executable instructions, when executed by the processing device, further cause the system to process the environmental audio information to generate the location information associated with the unmonitored sound source.

In some examples, the system further comprises the user input device, the user output device, the microphone, and a remote device comprising a remote device microphone. The remote device is configured to perform steps. Remotely monitored sound source information with respect to a remotely monitored sound source of the plurality of sound sources is set to the system. Remotely monitored sound source audio information corresponding to sound originating from the remotely monitored sound source is obtained from the from the remote device microphone. The remotely monitored sound source audio information is sent to the system. The sound source user output identifies the remotely monitored sound source, and the sound source audio information comprises the remotely monitored sound source audio information.

In some aspects, the present disclosure describes a non-transitory processor-readable medium having machine-executable instructions stored thereon. The machine-executable instructions, when executed by a processor device of a device, cause the device to perform a number of steps. Sound source user output is generated, identifying a plurality of sound sources. A user input is processed to designate a selected sound source of the plurality of sound sources as a noise source. Sound source audio information corresponding to sound originating from one or more sound sources of the plurality of sound sources is processed. The one or more sound sources includes the noise source. The sound source audio information is processed to generate a noise cancellation signal configured to cancel, at the listener's location, sound originating from the noise source. An audio output signal based on the noise cancellation signal is sent to an audio output device for presentation to the listener.

In some aspects, the present disclosure describes a processor-readable medium having instructions tangibly stored thereon. The instructions, when executed by a processor device, cause the processor device to perform the method steps described above.

BRIEF DESCRIPTION OF THE DRAWINGS

Reference will now be made, by way of example, to the accompanying drawings which show example embodiments of the present application, and in which:

FIG. 6A is an example user interface screen of an example supporting device of the ANC system of FIG. 2, showing a list of the sound sources of FIG. 4 with the selected sound source of FIG. 5A-5B highlighted, in accordance with examples described herein;

FIG. 6B is the example user interface screen of FIG. 6A, showing a user inputting a description for the selected sound source, in accordance with examples described herein;

FIG. 6C is the example table of sound source information stored in the memory of the ANC system of FIG. 2 following the input of the sound source description in FIG. 6B, in accordance with examples described herein;

Similar reference numerals may have been used in different figures to denote similar components.

DESCRIPTION OF EXAMPLE EMBODIMENTS

The present disclosure describes devices, methods, systems, and media for selectively cancelling sounds at a listener's location. Multiple sound sources are identified in the listener's environment using some combination of microphones and/or remote devices associated with specific sound sources. A user is presented with information identifying the sound sources and prompting the user to select one or more of the sound sources. After the user selects a sound source for cancellation, one or more microphones are used to monitor for sound originating from the sounds sources selected for cancellation, and the audio information captured by the microphones is processed to generate an anti-noise signal presented to the listener to cancel the sounds originating from the selected sound sources.

Figure 1A:
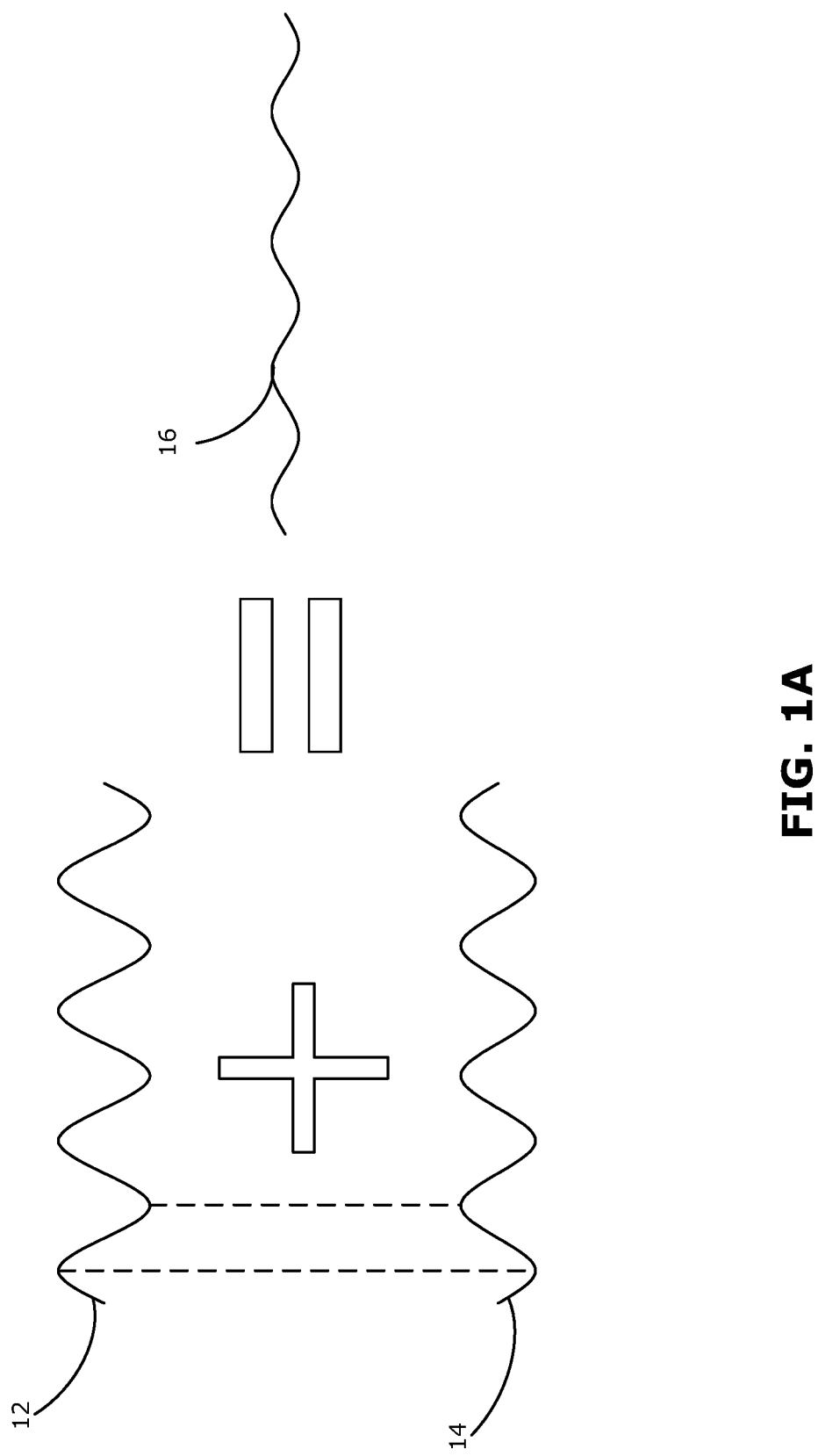
FIG. 1A is a simplified schematic illustrating the principle of active noise cancellation using anti-noise, in accordance with examples described herein.

FIG. 1A shows the principle of active noise cancellation using anti-noise. A sound signal 12, representing a source of noise (i.e. unwanted sound), and is processed to generate an anti-noise signal 14 with signal amplitude approximately inverse to that of the sound signal 12. The overlap of the two signals 12, 14 at a listener's location (e.g. at or near a human listener's ears, or at a recording microphone) results in an overall combined signal 16 that is close to neutral, i.e. no sound or only quiet (i.e. low-magnitude) sound. The anti-noise signal 14 may be overlapped with the sound signal 12 through various means: for example, a sound mixer may be used to sum the anti-noise signal 14 with an audio signal (e.g. a musical track) to generate a modulated output signal. The modulated output signal is presented to the listener to through headphones or a speaker, such that the timing of the sound signal 12 corresponds to the timing of the modulated anti-noise signal 14 embedded in the modulated output signal and results in the sound signal 12 being cancelled by the anti-noise signal 14, thereby resulting in the listener hearing only the original audio signal perturbed only by the low-amplitude overall combined signal 16.

It is also possible to cancel multiple noise sources. As noted above, existing approaches may cancel continuous or even intermittent noises by sampling environmental noise at the listener's location and generating an anti-noise signal to cancel the detected environmental noises; in effect, the multiple noise sources are treated as a single noise source measured at the listener's location. However, it is also possible to use one or more microphones, such as a directional microphone or an array of spatially separated microphones, to estimate the locations of two or more noise sources relative to the listener's location, use this estimated location information to estimate the timing and direction of arrival of the respective noises at the listener's location, and generate and present to the listener an anti-noise signal configured to cancel the noises at the time they arrive at the listener's location from the respective noise sources.

Figure 1B:
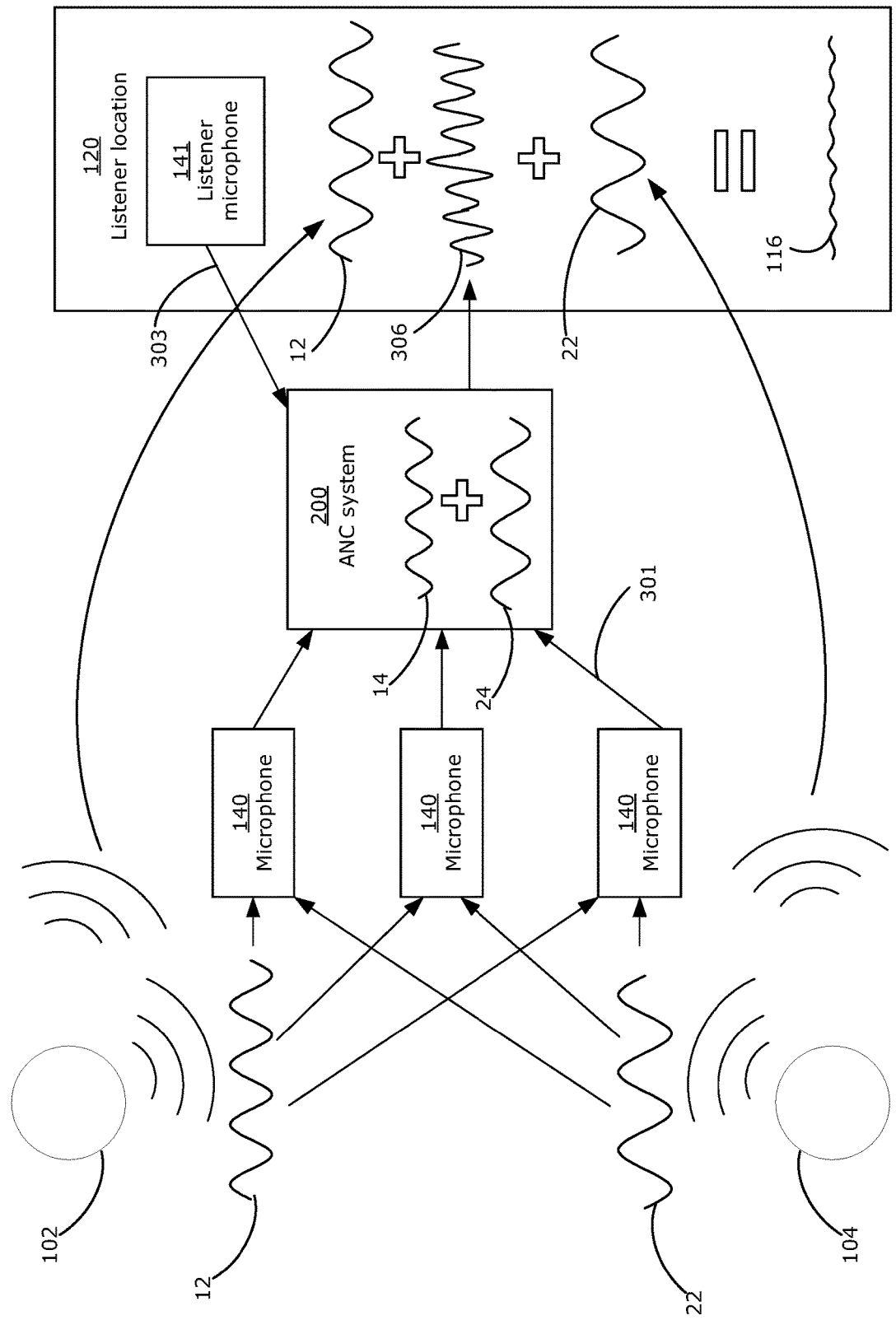
FIG. 1B is a block diagram of a simplified active noise cancellation (ANC) system for cancelling noise from two sound sources using multiple microphones, in accordance with examples described herein.

FIG. 1B shows a simplified active noise cancellation (ANC) system 200 for cancelling noise from two sound sources 102, 104 using multiple microphones 140. In some embodiments, the multiple microphones 140 may include one or more directional microphones; it may be possible to achieve the described results using a single directional microphone in some examples.

The first sound source 102 and second sound source 104 are categorized as noise sources in this example, i.e., the ANC system 200 is configured to cancel a first sound 12 originating from the first sound source 102 and a second sound 22 originating from the second sound source 104. The microphones 140 each receive both sounds 12, 22 from both sound sources 102, 104, with the timing, magnitude, and other characteristics of each sound 12, 22 received by each microphone 140 being a function of the location of the respective microphone 140 relative to the respective sound source 102, 104, as well as the environment (e.g. sound-reflecting surfaces and sound-reducing obstructions in the environment). Thus, a first microphone 140 at a first location may receive a mix of sounds at time t that consists of the first sound 12 and second sound 22 overlapping each other with different relative timings, different relative amplitudes, and different additional artifacts such as echoes and reverberation interacting with each sound 12, 22, whereas a second microphone 140 at a different location may receive a different mix of sounds due to its relative distance from the two sound sources 102, 104 and the different objects or forces present in its environment that may attenuate, amplify, echo, interfere with, or otherwise alter one or both sounds 12, 22. The microphones 140 are in communication with the ANC system 200; for example, the microphones 140 may be components of electronic devices such as Internet of Things (IoT) devices, smart home sensors, or mobile electronic devices, and the respective electronic device of each microphone 140 may include a wired or wireless communication interface enabling communication with the ANC system 200 using a communication protocol such as Ethernet, WiFi (IEEE 802.11), or Bluetooth™. The microphones 140 sense the sounds from the respective sound sources 102, 104 received at their respective locations, convert the sensed sounds to audio information, and send the audio information (referred to as environmental audio information 301) to the ANC system 200. Because electrical and radio-frequency signals travel faster than sound, the audio information may be received by the ANC system 200 prior to the corresponding sounds arriving at the listener's location 120 for each microphone 140 that is closer to the respective sound source 102, 104 than the listener location 120 is.

The ANC system 200 receives the environmental audio information 301 from the microphones 140 and uses the received environmental audio information 301 to cancel the noise from the sound sources 102, 104 at the listener's location 120. A detailed example of an ANC system 200 is described below with reference to FIGS. 2-3. For the purpose of the simplified representation in FIG. 1B, only the audio inputs and signal outputs of the ANC system 200 are shown. Specifically, the ANC system 200 processes the environmental audio information 301 to isolate the various sensed sounds 12, 22 in order to generate a first anti-noise signal 14 configured to cancel the first sound 12 as it is received at the listener location 120, and a second anti-noise signal 24 configured to cancel the second sound 22 as it is received at the listener location 120. The first anti-noise signal 14 and second anti-noise signal 24 are combined to generate a noise cancellation signal 306 that is configured to, when presented to the listener at the listener location 120, cancel the first sound 12 and second sound 22 at the listener location 120, resulting in a low-amplitude cancelled noise signal 116 that mitigates the noise originating from the first sound source 102 and second sound source 104 as perceived by the listener. In some embodiments, the noise cancellation signal 306 is generated directly without the intermediate steps of generating the first anti-noise signal 14 and second anti-noise signal 24.

In some examples, the noise cancellation signal 306 may be propagated into a space at the listener location 120 by a speaker, either alone or combined with a desired audio signal (such as music or audio from another media source such as a videoconference call); in other cases, the noise cancellation signal 306 may be presented to the listener through headphones or ear buds, either alone or combined with a desired audio signal. Examples of use cases involving different means of presentation of the noise cancellation signal 306 to the user are described in greater detail below with reference to FIGS. 5A-5B.

Thus, the ANC system 200 uses the differences between the mixes of sounds received at each microphone 140 to estimate various characteristics of the first sound 12 and second sound 22, such as the locations of the first sound source 102 and second sound source 104 and the timing and signal characteristics of the first sound 12 and second sound 22. This information is used by the ANC system 200 to estimate the signal characteristics of the first sound 12 and second sound 22 when they reach the listener location 120. This estimation operation may be assisted in some embodiments by a listener microphone 141 at the listener location 120, which may provide feedback audio information 303 to the ANC system 200 with respect to the actual signal characteristics of sounds arriving at the listener location 120 from the first sound source 102 and second sound source 104.

In some configurations, the ANC system 200 may use one or more microphones intentionally location in proximity to known sound sources. These microphones may be included as components in remote devices that may communicate with the ANC system 200 to provide more detailed information regarding their respective known sound sources. For example, a remote device may provide the ANC system 200 with information regarding the location of the known sound source and a description or identifier for the known sound source.

Figure 1C:
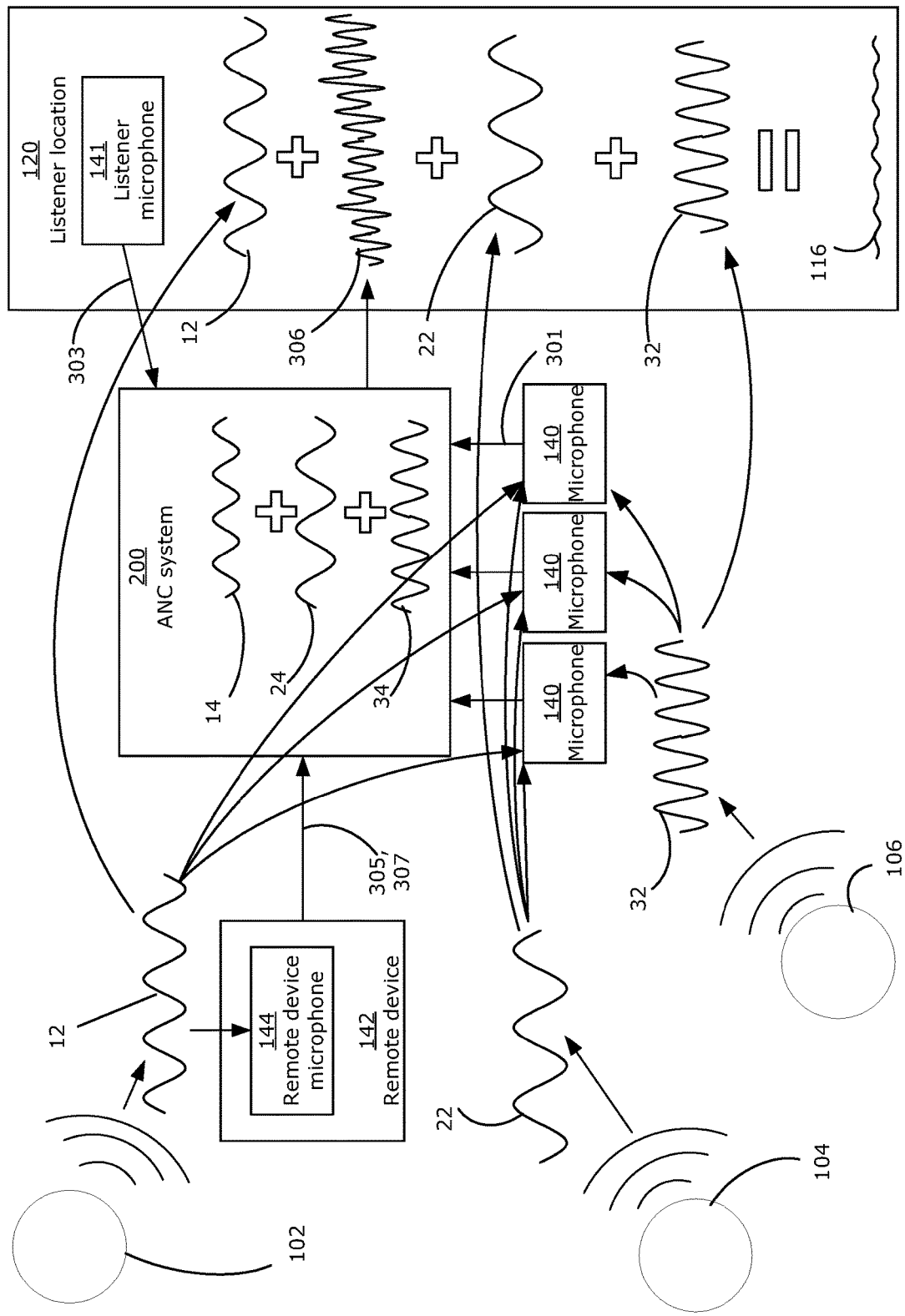
FIG. 1C is a block diagram of a simplified ANC system for cancelling noise from three sound sources using multiple microphones and a remote device, in accordance with examples described herein.

FIG. 1C shows a simplified ANC system 200 for cancelling noise from three sound sources 102, 104, 106 using multiple microphones 140 and a remote device 142. The remote device 142 includes a remote device microphone 144. In some examples, the remote device microphone 144 may perform the functions of one of the multiple microphones 140 as well as its own specific functions described herein; in some examples, the number of microphones 140 may be reduced to one or zero depending upon the configuration of one or more remote device microphones 144.

In the example of FIG. 1C, the first sound source 102 is considered to be monitored by a remote device 142 equipped with a remote device microphone 144, and may be referred to as a remotely monitored sound source. This means that the remote device 142 is intentionally placed close to the first sound source 102 in order to capture the first sound 12 with timing and other signal characteristics that are very close to those of the first sound 12 at its origin, i.e. first sound source 102. The remote device microphone 144 senses the first sound 12, converts the sensed first sound 12 into audio information, and sends the audio information (referred to as remotely monitored sound source audio information 307) to the ANC system 200, much like the microphones 140. In some examples, the sounds received by the remote device microphone 144 may be a combination of the first sound 12 and the other sounds 22, 32 in the environment, even if the first sound 12 is predominant based on the proximity of the remote device 142 to the first sound source 102; in such examples, the audio information sent to the ANC system 200 by the remote device microphone 144 may be used to assist in identifying the characteristics of the other sounds 22, 32 in the same way as the audio information received from the other microphones 140.

In some examples, the first sound source 102 and remote device 142 are identical: the remote device 142 may be an electronic device, such as a smart appliance (e.g. toaster, microwave, washing machine) that generates sounds (such as alert sounds and/or operation sounds) that are recorded by the remote device microphone 144 as the first sound 12. In some examples, the first sound source 102 is an electronic device, such as a television set or speaker, that broadcasts sounds based on a digital or analog electrical audio signal; in some such embodiments, the remote device 142 may omit the remote device microphone 144 and instead directly capture the analog or digital electrical audio signal from the first sound source 102 (which may or may not be identical to the remote device 142).

The remote device 142 may assist the ANC system 200 in isolating the first sound 12 from the other sounds 22, 32 in the environment, and in identifying the first sound source 102, by sending additional information to the ANC system 200. The additional information sent to the ANC system 200 from the remote device 142 is referred to as remotely monitored sound source information 305, and may include remotely monitored sound source location information identifying the location of the first sound source 102, as well as information identifying the first sound source 102 (e.g., a textual description of the first sound source 102 such as "Brand X Toaster Oven" or an identifier for the first sound source 102 that is associated with a textual description stored at the ANC system 200). The remotely monitored sound source location information may provide the ANC system 200 with a more accurate estimate of the location of the first sound source 102 than could be achieved through analysis of the audio information received from the microphones 140. The information identifying the first sound source 102 may be used by the ANC system 200 to present a user with information identifying the first sound source 102, as described in detail below with reference to FIGS. 6A-6C.

As in the example of FIG. 1B, the second sound source 104 produces second sound 22, which is received and sensed by the microphones 140 (and potentially also the remote device microphone 144). In addition, a third sound source 106 produces third sound 32, which is also received and sensed by the microphones 140 and/or remote device microphone 144.

The ANC system 200 receives the environmental audio information 301 from the microphones 140, the remotely monitored sound source audio information 307 from the remote device microphone 142, and feedback audio information 303 from the listener microphone 141, and processes these data to isolate the sounds 12, 22, 32 and generate corresponding first, second, and third anti-noise signals 14, 24, 34 configured to cancel the first sound 12, second sound 22, and third sound 32 respectively. The three anti-noise signals 14, 24, 34 are combined (e.g. using a sound mixer) to generate the noise cancellation signal 306. As in the example of FIG. 1B, in some embodiments the intermediate step of generating the three anti-noise signals 14, 24, 34 may be omitted, and the noise cancellation signal 306 may be generated directly based on the received environmental audio information 301 and remotely monitored sound source audio information 307. The noise cancellation signal 306, when presented to the listener at the listener location 120 is configured and timed to cancel the first noise 12, second noise 22, and third noise 32 as they arrive at the listener location 120, as described in the example of FIG. 1B above.

An example ANC system 200, such as those shown in FIGS. 1B-1C, will now be described. An example configuration of an ANC system 200, including various hardware and software components, will be described with reference to FIG. 2. The operation of an example selective noise cancellation module 210 of an ANC system 200 will be described with reference to FIG. 3.

Figure 2:
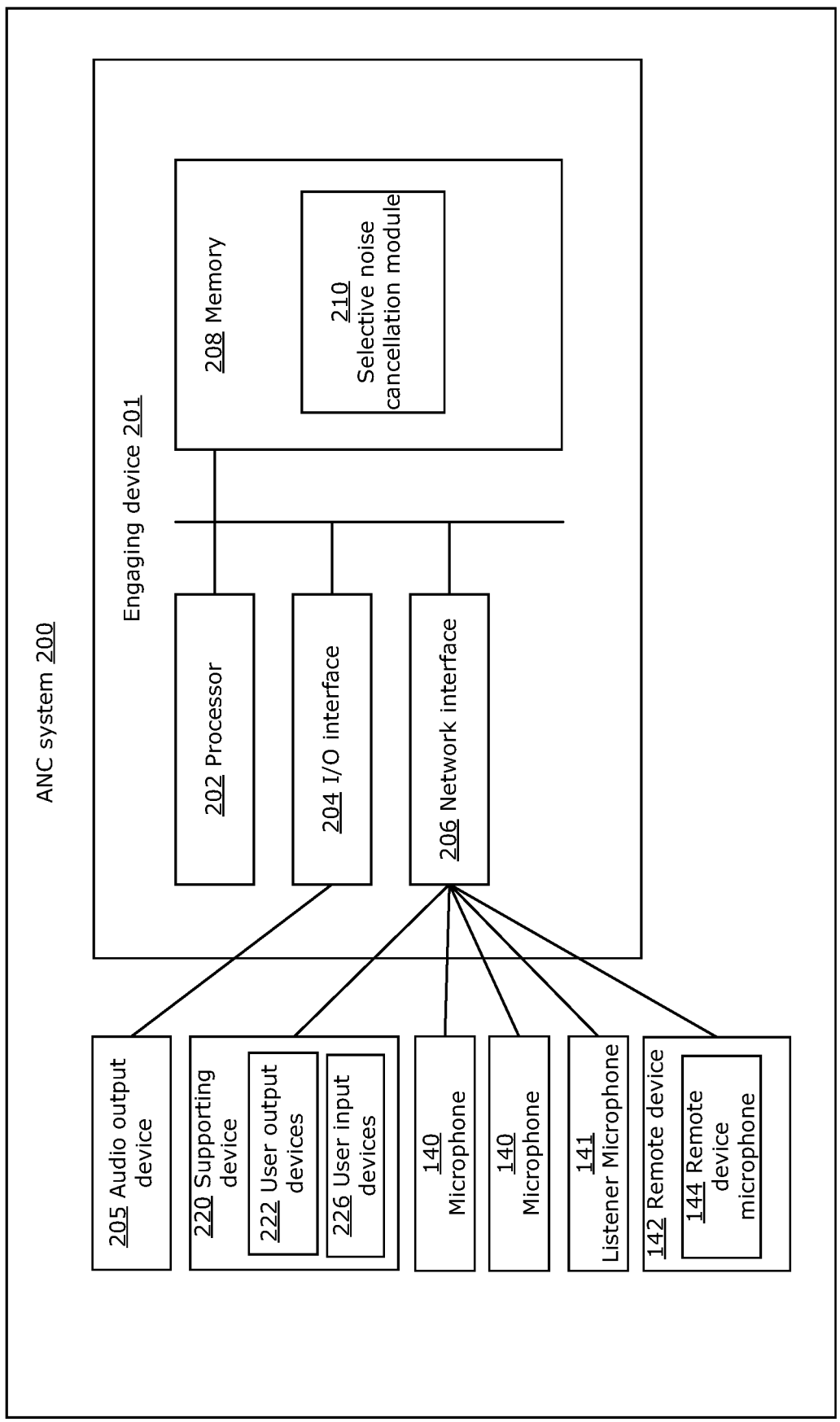
FIG. 2 is a block diagram illustrating an example ANC system including an engaging device, in accordance with examples described herein.

FIG. 2 is a block diagram illustrating components of an example ANC system 200. The example ANC system 200 includes an engaging device 201, a supporting device 220, one or more microphones 140, a listener microphone 141, one or more remote devices 142, and one or more audio output devices 205. Although an example embodiment of the ANC system 200 is shown and discussed below, other embodiments may be used to implement examples disclosed herein, which may include components different from those shown. Although FIG. 2 shows a single instance of each component of the ANC system 200, there may be multiple instances of each component shown, and one or more of the components shown may be omitted in some embodiments. In some examples, for the sake of clarity, one or more of the components shown may be described as external to the ANC system 200, such as the microphones 140 in FIGS. 1B and 1C; in such examples, the functions of the ANC system 200 may be those performed by the engaging device 201 of FIG. 2

The engaging device 201 is an electronic device or system that performs the computational steps necessary to perform active noise cancellation and communicates directly with an audio output device 205, such as a speaker or a set of headphones, that generates sound at the listener location 120 that cancels noise arriving at the listener location 120. In some embodiments, one or more of the functions of the engaging device 201 may be distributed among more than once device, such as a remote device 142, the supporting device 220, and/or an additional device or computing system not shown in FIG. 2 such as a cloud computing platform. In some embodiments, such as the example described below with reference to FIG. 5B, all of the functions of the engaging device 201 and the supporting device 220 are combined in a single engaging device 201.

The engaging device 201 includes one or more processors 202, such as a central processing unit, a microprocessor, an application-specific integrated circuit (ASIC), a field-programmable gate array (FPGA), a dedicated logic circuitry, a tensor processing unit, a neural processing unit, a dedicated artificial intelligence processing unit, or combinations thereof. The one or more processors 202 may collectively be referred to as a "processor device". The engaging device 201 also includes one or more input/output (I/O) interfaces 204, which interface with input devices such as the audio output device 205. The engaging device 201 may interface with other input devices (e.g., buttons, touchscreen, keyboard, etc.) and other output devices (e.g., display, vibration unit, etc.) included in the ANC system 200.

The engaging device 201 may include one or more network interfaces 206 for wired or wireless communication with a network (e.g., an intranet, the Internet, a P2P network, a WAN and/or a LAN) or other node. The network interface(s) 206 may include wired links (e.g., Ethernet cable) and/or wireless links (e.g., one or more antennas) for intra-network and/or inter-network communications. In some embodiments, one or more network interfaces 206 may be used as, or instead of, the I/O interfaces 204 for communication with one or more of the input devices and/or output devices described above, for example using 802.11 or Bluetooth™ wireless communication. In the example of FIG. 2, the microphones 140, listener microphone 141, supporting device 220, and remote device(s) 142 all communicate with the engaging device 201 via a network interface 206; however, in some embodiments, one or more of these components may communicate with the engaging device 201 via an I/O interface 204.

The engaging device 201 includes one or more memories 208, which may include a volatile or non-volatile memory (e.g., a flash memory, a random access memory (RAM), and/or a read-only memory (ROM)). The non-transitory memory(ies) 208 may store machine-executable instructions for execution by the processor(s) 202, such as to carry out examples described in the present disclosure. A set of machine-executable instructions defining a selective noise cancellation module 210 is shown stored in the memory(ies) 208, which may be executed by the processor(s) 202 to perform the steps of the methods described herein. The operation of the ANC system 200 in executing the selective noise cancellation module 210 is described below with reference to FIG. 3. The selective noise cancellation module 210 includes machine-executable instructions that are executable by the processor(s) 202 to perform the functions of each subsystem 310, 320, 330 thereof. The memory(ies) 208 may include other software instructions, such as for implementing an operating system and other applications or functions.

In some examples, the engaging device 201 may also include one or more electronic storage units (not shown), such as a solid state drive, a hard disk drive, a magnetic disk drive and/or an optical disk drive. In some examples, one or more data sets and/or modules may be provided by an external memory (e.g., an external drive in wired or wireless communication with the engaging device 201) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The components of the engaging device 201 may communicate with each other via a bus, for example.

The remote device 142, as previously described, is an electronic device that may include a remote device microphone 144. The remote device 142 may also include any other components necessary to operate the remote device microphone 144 to sense sounds, sample the sensed sounds to generate audio information samples, store the audio information samples as remotely monitored sound source audio information 307, and transmit the remotely monitored sound source audio information 307 to the engaging device 201 over a network or via an I/O interface 204 of the engaging device 201. These components may include, e.g., a processor device, a memory, and a network interface. Examples of remote devices 142 include an IoT device, a smart home microphone device, a smart home camera device with microphone capability, or a mobile electronic device such as a mobile phone intentionally placed near a known sound source.

The supporting device 220 includes one or more user input devices 226 and one or more user output devices 222. The supporting device 220 may also include any other components necessary to operate the user input devices 226 and one or more user output devices 222, and communicate with the engaging device 201 over a network or via an I/O interface 204 of the engaging device 201. These components may include, e.g., a processor device, a memory, and a network interface. Examples of supporting devices 220 include a laptop or desktop computer, a tablet, a wearable electronic device, or a mobile electronic device such as a mobile phone. In some embodiments, some of the functions of the supporting device 220 may be performed by the engaging device 201; for example, the engaging device 201 may be a laptop computer with a display that serves as a user output device 222, whereas the supporting device 220 includes an inertial measurement unit (IMU) that acts as a pointer device, thereby serving as a user input device 226.

It will be appreciated that references herein to user input devices and user output devices may refer to user input devices 226 or user output devices 222 of the supporting device 220, or to user input devices and user output devices in direct communication with the engaging device 201 via an I/O interface 204. In addition, references herein to the engaging device 201 communicating with the audio output device 205 may refer either to direct communication with the audio output device 205 via an I/O interface 204 or to communication with another electronic device or computing system (not shown) that controls the ultimate output to the audio output device 205.

The various user output devices are intended to provide information to a user, and the various user input devices are intended to obtain information from the user. In some cases, the user may be a human listener at the listener location; in other cases, the listeners may be a group of people and/or a non-human listener (e.g. an animal or a recording microphone) at the listener location 120, and/or the user may be present somewhere other than the listener location, such as an audio engineer located in a control room outside of the listener location 120, e.g. a live room or isolation booth of a recording studio.

The operation of an example selective noise cancellation module 210 of the ANC system 200 will now be described. The selective noise cancellation module 210 may perform the operations described below when executed, e.g., by the processor 202 of the engaging device 201.

Figure 3:
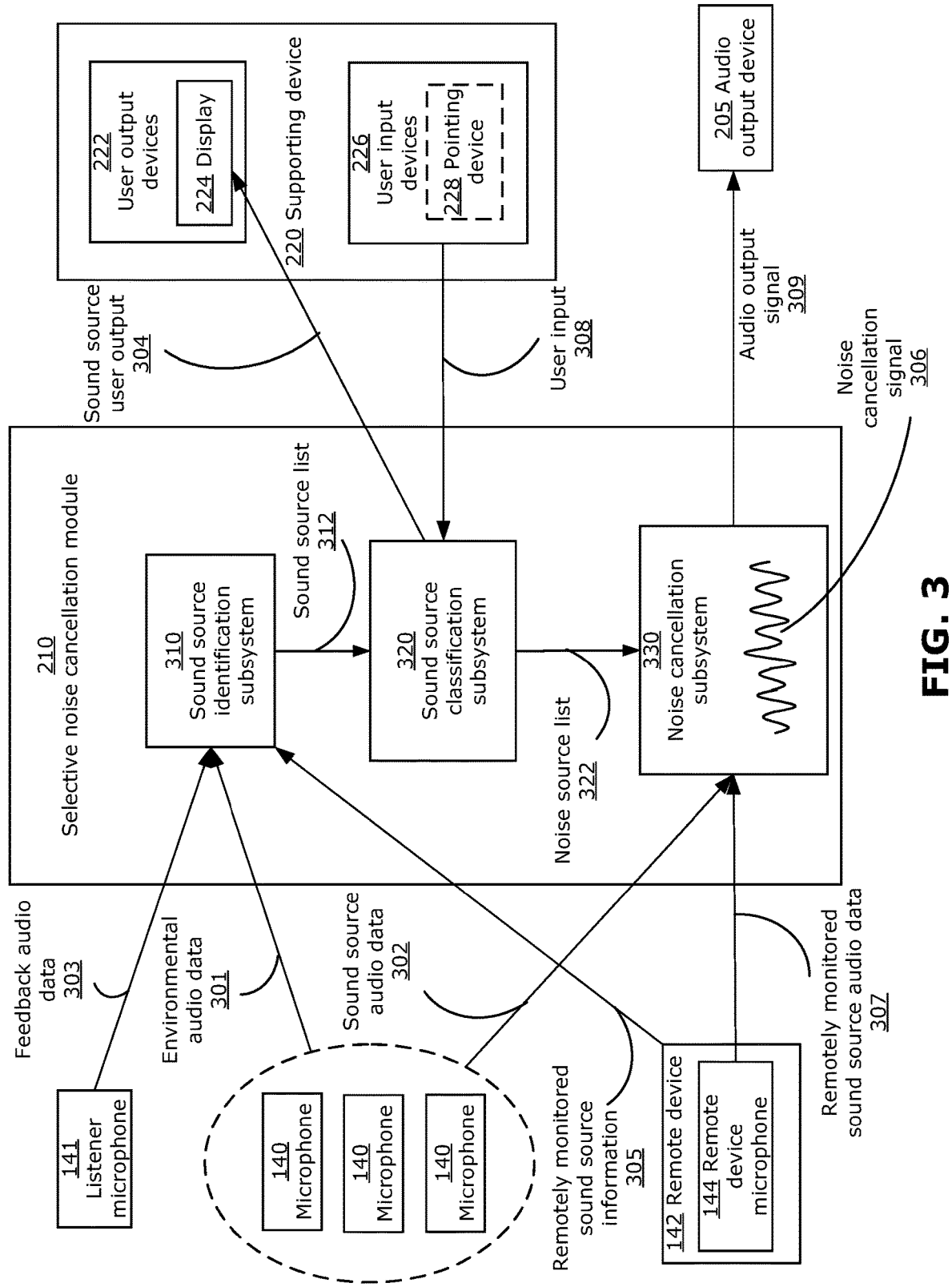
FIG. 3 is a block diagram illustrating the inputs and outputs of various subsystems of an example selective noise cancellation module of the ANC system of FIG. 2.

FIG. 3 is a block diagram illustrating the inputs and outputs of various subsystems of an example selective noise cancellation module 210. The selective noise cancellation module 210 includes three subsystems: a sound source identification subsystem 310, a sound source classification subsystem 320, and a noise cancellation subsystem 330. The various inputs and outputs of the selective noise cancellation module 210 are shown using arrows between the subsystems 310, 320, 330 and various components of the ANC system 200; it will be appreciated that these inputs and outputs are made available to and by the subsystems 310, 320, 330 using the various components of the ANC system 200 such as the network interfaces 206, memory 208, I/O interfaces 204, and processor 202.

The selective noise cancellation module 210 operates to enable a user to selectively cancel noises from some sound sources in the environment and not others, based on user preferences expressed through user input. The sound source identification subsystem 310 operates to identify and isolate the various sound sources in the listener's environment. The sound source classification subsystem 320 operates to present a user with information identifying each sound source and prompting the user to select one or more sound sources to cancel (i.e., to classify one or more of the sound sources as noise sources). The noise cancellation subsystem 330 operates to generate an anti-noise signal (i.e. noise cancellation signal 306) configured to cancel the subset of sounds sources designated by the user as noise sources and present the noise cancellation signal 306 to the listener at the listener location. The operation of each subsystem will now be described in greater detail.

The sound source identification subsystem 310 may begin its operation with an initialization process whereby the engaging device 201 communicates with all the other devices of the ANC system 200 (e.g. the microphones 140, listener microphone 141, remote device(s) 142, and supporting device 220) and compiles a list of microphones available for every such device. The list of microphones is used to identify sound sources and also enables the sound source identification subsystem 310 to estimate the direction of arrival of various sounds to the engaging device 201 (i.e., at the listener location 120).

Once the list of microphones has been generated in an initialization process, the sound source identification subsystem 310 obtains the environmental audio information 301 from the microphone(s) 140, the remotely monitored sound source audio information 305 from the remote device 142, and the feedback audio information 303 from the listener microphone 141. These various types of audio information are used to isolate the sound from each sound source and estimate a location for each sound source (e.g., using triangulation based on the relative timing, phase, amplitude, or other signal property of the sounds from each sound source).

In some embodiments, the sound source identification subsystem 310 uses the list of microphones to capture sounds in the environment. The sounds are decoupled to isolate individual sound sources by capturing sounds from different microphones: the direction of arrival and position of the sound source can be estimated using spatial capabilities.

Once the sound from each sound source has been isolated, a list of sound sources (referred to as a sound source list 312) may be generated by the sound source identification subsystem 310. The sound source list 312 may include location information and/or a description or identifier (as described above) for each remotely monitored sound source. Unmonitored sound sources (i.e. all sounds sources identified by the sound source identification subsystem 310 that are not monitored by a remote device 142) may be included in the sound source list 312 with an estimated location and a placeholder name or description (e.g., "Unknown" or "Sound Source 2"). The sound source list 312 also includes the information necessary to isolate and identify sounds originating from each sound source within a mix of sounds received by the various microphones of the ANC system 200.

Once a location for each sound source has been estimated or provided by a remote device 142, the locations of the sound sources relative to the listener location 120 may be represented as sound source location information, such as directional information, and added to the sound source list 312. A visual representation of directional information of an example sound source list 312 is shown in FIG. 4.

Figure 4:
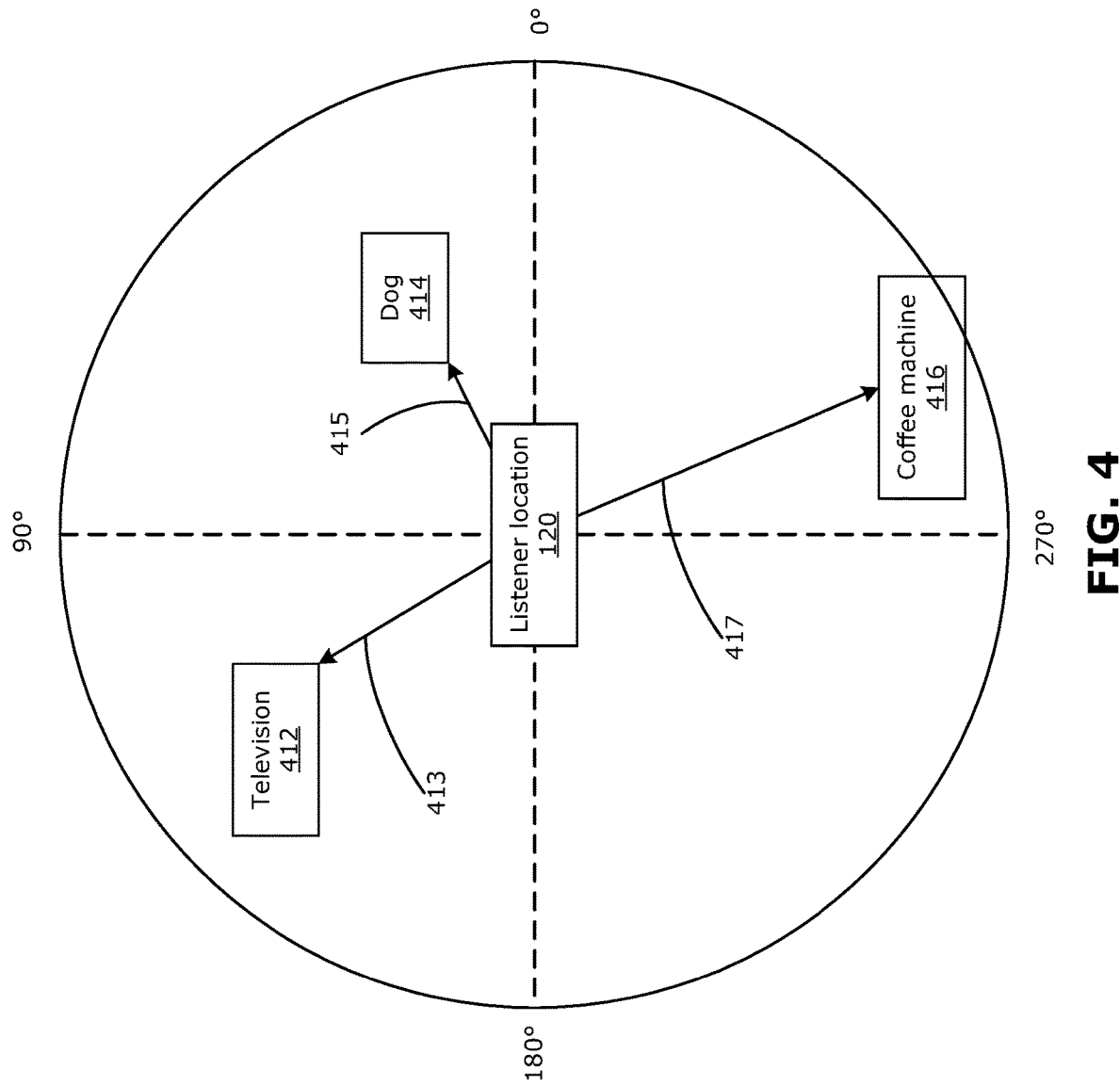
FIG. 4 is a top view of a listener's environment showing directions of sound sources relative to the listener's location, providing an example operating context for examples described herein.

FIG. 4 is a top view of a listener's environment showing directions of sound sources relative to the listener location 120. In some embodiments, the listener location 120 may be defined as the location of the engaging device 201, which is assumed to be present in the same location as the intended listener. In other embodiments, the listener location 120 may be a separate known location of a listener (such as a recording microphone or a human listener). The listener location 120 may be defined relative to the locations of the sound sources, for example by using the feedback audio information 303 communicated to the engaging device 201 by the listener microphone 141. Thus, in some embodiments, the listener location 120 and the estimated location of each sound source may all be defined relative to each other, for example based on the relative time of arrival of various audio signals propagated through space at the various microphones 140, 141, 144 of the ANC system 200. In other embodiments, the absolute and/or relative locations of various components of the ANC system 200 may be determined using means such as radio signal triangulation and/or global positioning system (GPS) sensors included in the various devices 201, 220, 142, 140, 141. The locations of the sound sources relative to these devices may then be determined based on the signal properties, such as time of arrival, of sounds originating from the respective sound sources.

In FIG. 4, the sound sources identified by the sound source identification subsystem 310 are shown in a top-down view with the listener location 120 located at the center and the locations of the sound sources defined by an angular direction in a horizontal plane. The angular directions have values from 0 degrees to 359 degrees. It will be appreciated that FIG. 4 is provided as a simplified example, and some embodiments may use other means of defining the direction or location of a sound source relative to the listener location 120, such as two-dimensional or three-dimensional vectors. However, in the simplified example of FIG. 4, three sound sources are identified in the sound source list 312: a dog 414 located in a dog direction 415 of approximately 30°, a television 412 located in a television direction 413 of approximately 110°, and a coffee machine 416 located in a coffee machine direction 417 of approximately 290°, relative to the listener location 120.

In some embodiments, the sound source list 312 may be represented as a table of sound source information, such as the sound source table 660 described below with reference to FIG. 6C.

Returning to FIG. 3, the sound source classification subsystem 320 receives the sound source list 312 from the sound source identification subsystem 310. The sound source classification subsystem 320 generates sound source user output 304 based on the sound source list 312 and sends the sound source user output 304 to a user output device (e.g., a user output device 222 of the supporting device 220 or a user output device in communication with the engaging device 201 via an I/O interface 204), shown in FIG. 3 as a display 224. The sound source user output 304 may include some or all of the information from the sound source list 312 with respect to each sound source: for example, in some embodiments the sound source user output 304 may include location information and a textual description for each sound source.

The user output device presents the sound source user output 304 to a user. The user output device may be a display 224 as shown in FIG. 3, or it may be another user output device such as a speaker or other audio output device. In examples using a display 224, the sound source user output 304 may be presented to the user as a spatial representation of the sound sources as shown in FIG. 4, and/or a table of sound source information as shown in FIG. 6A or 6B (described below), and/or any other visual representation of sound source information from the sound source list 312. In some examples, the sound source user output 304 may be presented to the user via more than one user output device; for example, the display 224 may be used to show the user a spatial representation of the sound sources relative to the listener location 120 (as illustrated in FIG. 4), and a speaker may be used to present sounds to the user based on the user's interactions with the spatial representation. For example, the speaker may amplify the sound from a given sound source when the user selects the sound source using a keyboard or a mouse to interact with a graphical user interface or by pointing a pointing device 228 in the direction of the sound source. Examples of user interaction with the sound source user output 304 are described below with reference to FIGS. 6A-6B.

A user input device is used to obtain user input 308 from the user, indicating the user's preferences for noise cancellation. Specifically, the user input 308 designates one or more of the sound sources as a noise source, i.e. it indicates the user's preference to cancel sounds originating from the one or more sound sources designated as noise sources. The user input device may be a user input device 226 of the supporting device 220 or may be in direct communication with the engaging device 201 via an I/O interface 204. In some embodiments, the user input includes a binary value associated with each of one or more of the sound sources, indicating a user preference to set a cancellation preference for the sound source to "yes" (i.e., designating the sound source as a noise source) or "no" (i.e., designating the sound source as not being a noise source). In some embodiments, the association between a given binary cancellation preference value and a sound source is established by the user pointing a pointing device 228 in the direction of the sound source, as described with reference to FIGS. 5A-5B below.

Figure 5A:
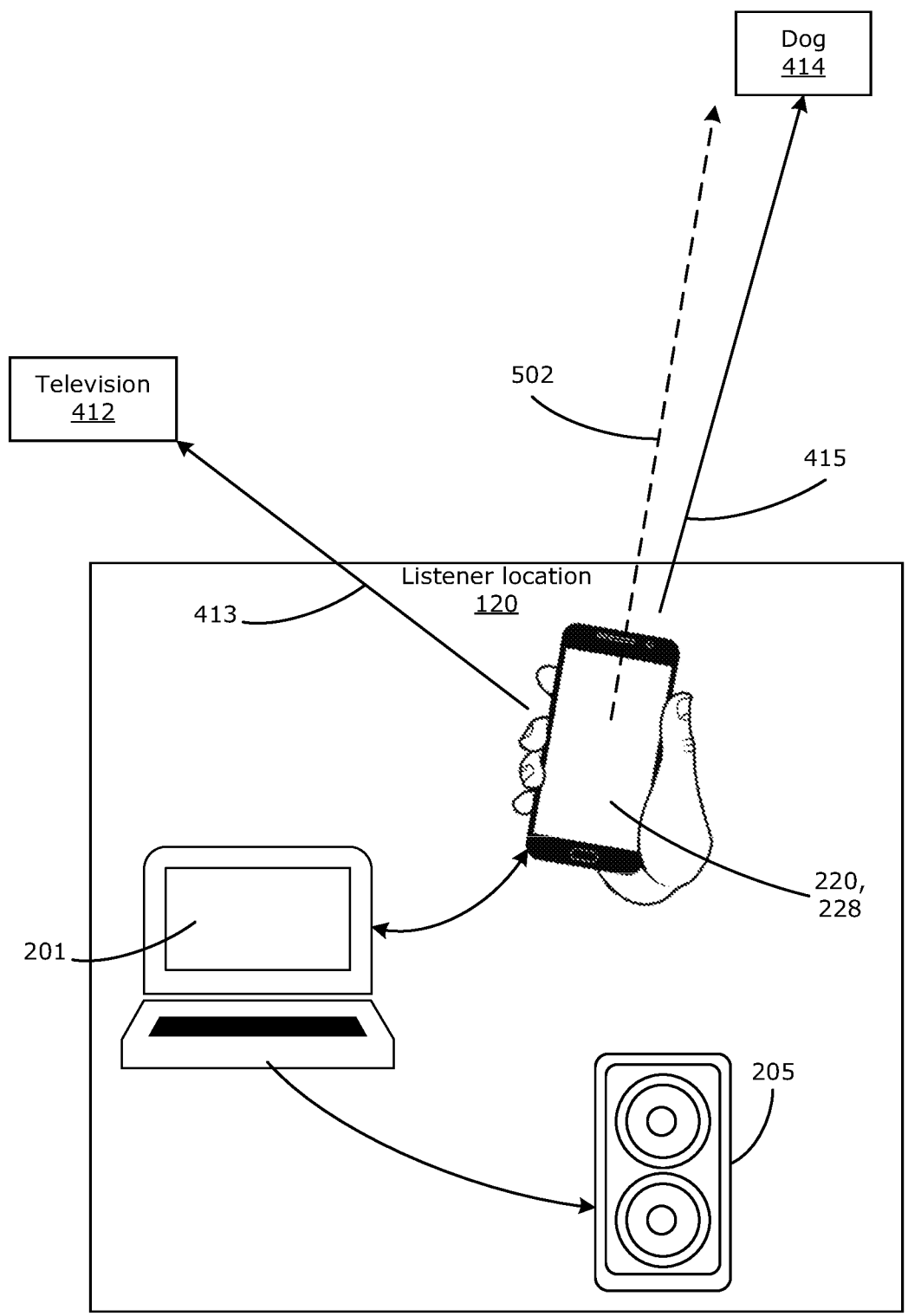
FIG. 5A is a simplified spatial representation of a user operating a pointing device to select a sound source of FIG. 4 based on the direction of the sound source relative to the listener's location, and showing a first example configuration of the ANC system of FIG. 2 including a laptop, mobile phone, and speaker, in accordance with examples described herein.

FIG. 5A shows a user operating a pointing device 228 to select a sound source based on the direction of the sound source relative to the listener's location. In this example, the ANC system 200 includes a laptop computer as the engaging device 201, a mobile phone as the supporting device 220, and a speaker as the audio output device 205. The mobile phone (i.e. the supporting device 220) can be used as a pointing device 228 by pointing it in a given direction; an internal IMU and/or other sensors of the mobile phone may be used to determine an orientation of the mobile phone to determine a pointing direction (the IMU and/or other sensor(s) may be considered a user input device 226 of the supporting device 220 in this example). The pointing direction may be included in the user input 308 sent from the supporting device 220 to the engaging device 201, and the engaging device 201 may compare the pointing direction received in the user input 308 to the direction information associated with each sound source, and use the result of this comparison to determine that the user is pointing toward a given sound source. In some embodiments, this comparison may be performed by determining which of the plurality of sound sources has a direction closest to the pointing direction; in some embodiments, other types of comparison may be performed, such as determining whether the pointing direction is within a proximity threshold (e.g. an angular proximity threshold, such as plus or minus 10 degrees) of the direction of a given sound source.

In the example of FIG. 5A, the user is using the mobile phone (supporting device 220) to select the dog 414 from the plurality of sound sources in the environment by pointing the mobile phone in pointing direction 502, which is close to the dog direction 415. In some examples, using the mobile phone to point in the pointing direction 502 is interpreted by the engaging device (shown as a laptop computer) as the user selecting the dog 414 to designate it as a noise source or to designate it as not a noise source. If the user were to point the mobile phone closer to the television direction 413, the television 412 would be selected for interaction instead of the dog 414, based on a comparison of the pointing direction 502 to the directions of the various sound sources, as described above.

Figure 5B:
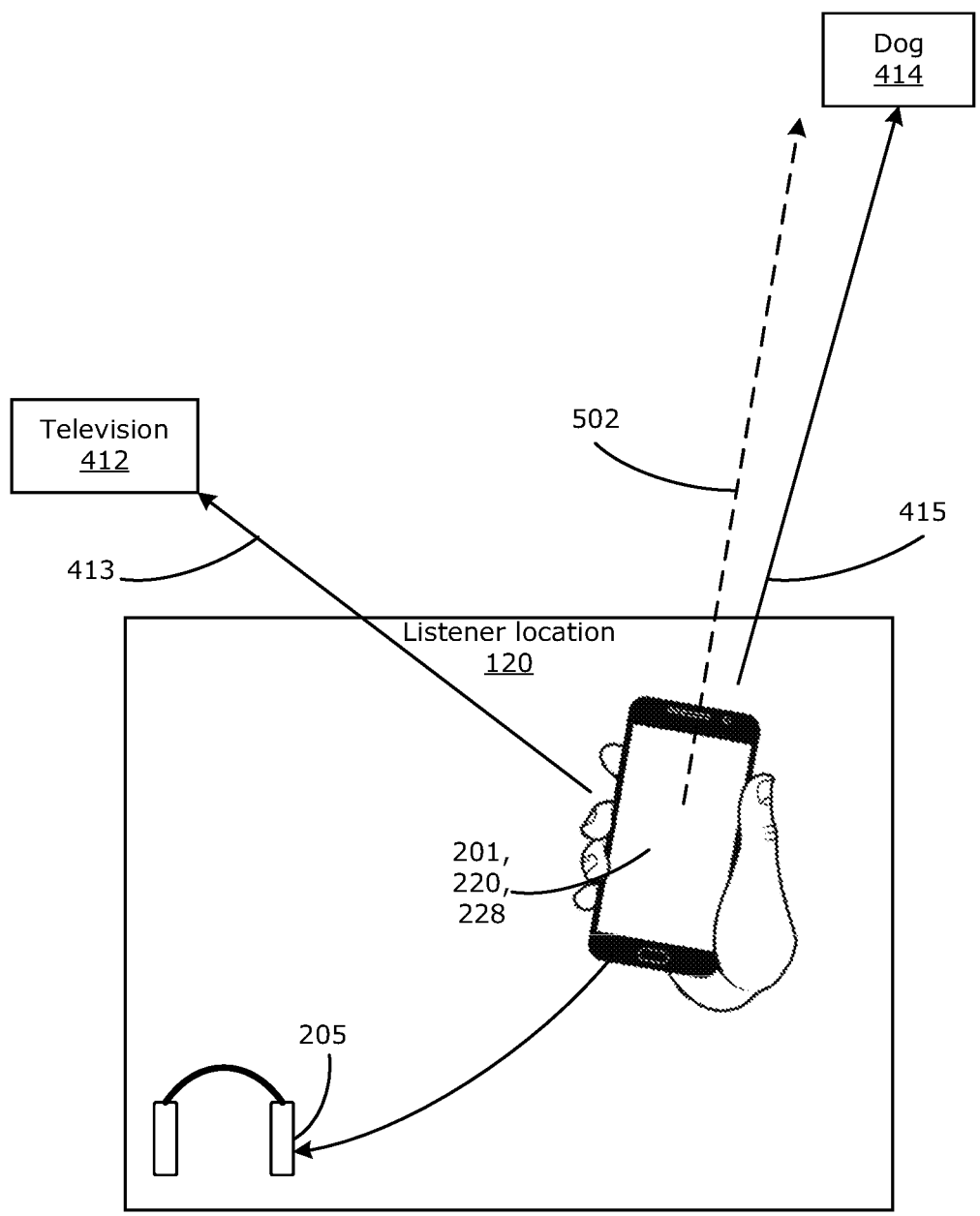
FIG. 5B is a simplified spatial representation of a user operating a pointing device to select a sound source of FIG. 4 based on the direction of the sound source relative to the listener's location, and showing a second example configuration of the ANC system of FIG. 2 including a mobile phone and headphones, in accordance with examples described herein.

FIG. 5B shows a second example configuration of the ANC system 200 being used to perform the pointing device-based sound source selection operation of FIG. 5A. The ANC system 200 shown in FIG. 5B includes a mobile phone performing the functions of both the engaging device 201 and the supporting device 220, and headphones being used as the audio output device 205.

FIG. 6A shows a user interface (UI) screen 600 presented to the user via the display 224 of a supporting device 220 during the sound source selection operation of FIG. 5A or 5B. The screen 600 is an example of the sound source user output 304 presenting sound source information to the user. The sound sources 412, 414, 416 are shown in a table on the screen 600, with a first row 606 corresponding to the television 412, a second row 608 corresponding to the coffee machine 416, and a third row 610 corresponding to the dog 414. Each row 606, 608, 610 displays information in a first column 602 labelled "Sound Source" and a second column 604 labelled "Noise?". The first column 602 shows a textual description for each sound source. The textual description may be populated with a description for the sound source, such as the text "Television" 616 for the television 412, which may be populated by a remote device 142 monitoring the television 412, or placeholder text such as "Unknown" 618 for the dog 414, which is an unmonitored sound source. The second column 604 shows noise designation information for each sound source, shown here as a graphical user interface (GUI) toggle switch 612 between a "No" value and a "Yes" value for whether the sound source is designated as a noise source. The user may use a user input device such as a touchscreen or mouse to toggle the value of the noise designation value for a given sound source.

The screen 600 also shows a sound source selection indicator 614, which may be represented visually as highlighting in a distinct colour or some other visual indication that a given row of the table 600 (in this case, the third row 610) is currently selected. In this example, the third row 610 corresponding to the dog 414 is selected because the user is determined to be pointing toward the dog direction 415 using the pointing device 228 of the supporting device 220, as shown in FIG. 5A or 5B. By identifying which sound source is currently selected, the screen 600 allows a user to identify and designate sound sources in the environment by pointing toward them.

FIG. 6B shows a second UI screen 650. The user may enter a new or modified textual description for a sound source by selecting the description field in the first column 602 and entering text into a text entry box 654. In this example, the user is entering the textual description "Dog" (using a text input user input device such as a keyboard or a touchscreen's on-screen keyboard) in the description field for the third row 610, which is currently selected by the pointing device 228. This textual description may be stored, e.g. in the memory 208 of the engaging device 201, in association with the sound source information for the dog 414 and may be used in future sessions to identify the dog 414 sound source to the user.

It will be appreciated that the screens 600, 650 are provided simply as examples of user output that may be presented to a user to enable the user interactions described herein. Other embodiments may make use of other suitable user output, such as a spatial representation of the sound sources as shown in FIG. 4. A user could edit placeholder text associated with sound sources in the spatial representation much like the operation described with reference to FIG. 6B above, and the user may toggle the designation of a given sound source as a noise source by including a toggle switch 612 or similar indication of noise source designation in the visual representation of each sound source. In some embodiments, the visual representation of each sound source (e.g., a row of the table 600 or 650 or the spatial representation of the sound source in FIG. 4) may include other information, such as a numerical identifier for the direction of the sound source. Any suitable visual and/or auditory representation of the sound sources may be used to enable the interactions described and claimed herein.

As a further example, a simplified user interface could be provided in some embodiments in which a user points the pointing device 228 toward a sound source and performs a further action to "mute" the sound source (i.e. designate the sound source as noise), such as pressing a "Mute" GUI button on a mobile phone touchscreen or performing a further gesture with the pointing device 228. In some embodiments, two or more noise source designation techniques can be provided by the selective noise cancellation module 210, allowing a user to designate noise source easily in one user interface mode and providing greater information and control to the user in another user interface mode.

FIG. 6C shows an example table 660 of sound source information stored in the memory 208 of the engaging device 201 following a user session according to the examples UI screens 600, 650 of FIGS. 6A-6B. For each sound source entry in the table 660, shown as rows 672, 674, 676, the table 660 includes a Sound Source ID column 662 storing a numerical identifier for the sound source, a Description column 664 storing the textual description for the sound source (e.g., text from a remote device 142 of a monitored sound source or text entered by the user as shown in FIG. 6B), a "Designation for Cancellation" column 666 storing a noise designation value for the sound source (e.g., based on the setting of the toggle switch 612 from FIG. 6A), and a Direction column 668 storing location information (shown here as an angle indicating the sound source direction) for the sound source.

The user interactions shown in FIGS. 5A through 6B may be performed repeatedly or continuously while the selective noise cancellation module 210 is being executed by the processor 202. The sound source user output 304 (e.g. screens 600 and 650) may be generated by the engaging device 201 and/or supporting device 220 and presented to the user via one or more user output devices (such as display 224), and user input 308 may be obtained by the supporting device 220 and/or engaging device 201 from one or more user input devices, such as a pointing device 228 and touchscreen of the supporting device 220, and these steps may be performed repeatedly as the user continues to interact with the selective noise cancellation module 210.

The user interactions described above with reference to FIGS. 5A through 6B may exhibit advantages over existing approaches to noise cancellation. Users may be empowered to designate some sound sources in the environment as noise and not others, thereby allowing the listener to continue hearing sounds from some sources, such as important alerts originating from appliances, crying babies, or media devices the listener wishes to hear such as televisions. By providing a simple, user friendly interface to view and classify ambient sounds as noise rather than signal properties like frequencies and wavelengths, the GUI may make identification and classification of sound sources as noise very easy for a user.

When the sound source classification subsystem 320 receives user input 308 designating one or more of the sound sources as noise sources (e.g., by one or more of the toggle switches 612 being set to the "Yes" value), the sound source classification subsystem 320 generates a noise source list 322 indicating the sound sources designated as noise sources and sends the noise source list 322 to the noise cancellation subsystem 330. The noise source list 322 also includes the information necessary to isolate and identify sounds originating from each sound source within a mix of sounds received by the various microphones of the ANC system 200, as indicated by the sound source list 312.

The noise cancellation subsystem 330 performs selective noise cancellation based on the noise source list 322. The various microphones 140, 141, 144 of the ANC system 200 are used to obtain sound information: at a given time t, the sounds received by each microphone at a given time may be a mix of sounds originating from each sound source emitting sound at time t, which may be referred to as the current "active sound sources". Sounds originating from each active sound source are isolated continuously by the sound source identification subsystem 310, and the noise cancellation subsystem 330 operates to generate an anti-noise signal (i.e. noise cancellation signal 306) configured to cancel the noises originating from each active sound source designated as a noise source in the noise source list 322. The noise cancellation subsystem 330 sends an audio output signal 309 based on the noise cancellation signal 306 to the audio output device 205 such that the timing and signal characteristics of the noise cancellation signal 306 components of the audio output signal 309 cancel the sounds originating from the noise sources as those sounds arrive at the listener location 120. In some examples, the audio output signal 309 is the noise cancellation signal 306; in other embodiments, the audio output signal 309 is the noise cancellation signal 306 combined (e.g., using a sound mixer) with a desired audio signal, such as the output of a music player software application or a videoconferencing software application executed by the engaging device 201.

Figure 7:
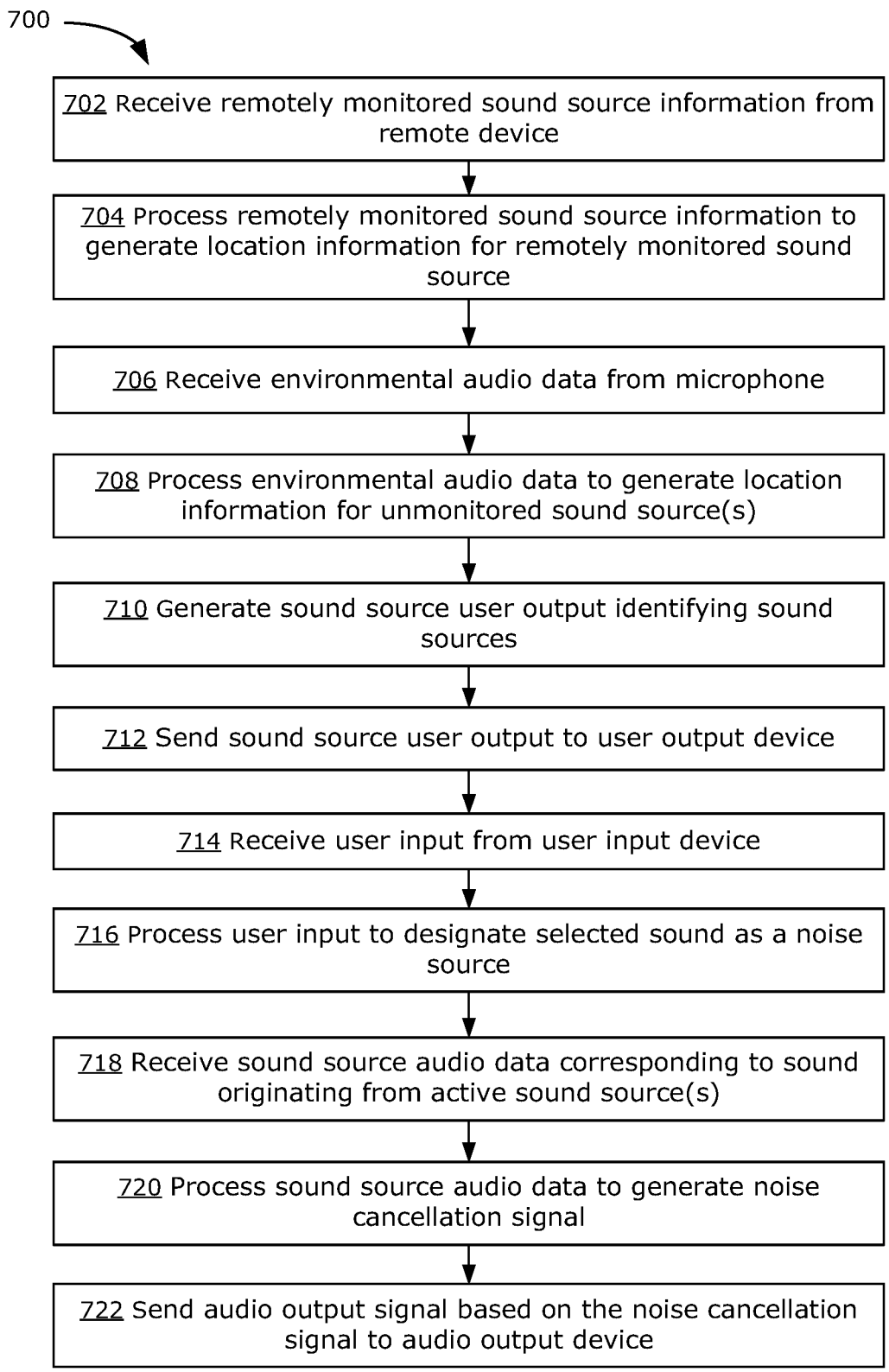
FIG. 7 is a flowchart showing the steps of an example method for selectively cancelling sounds at a listener's location, in accordance with examples described herein.

FIG. 7 is a flowchart showing the steps of an example method 700 for selectively cancelling sounds at a listener's location 120. In the example embodiments described below, the method 700 is performed by the selective noise cancellation module 210 as part of the ANC system 200. However, it will be appreciated that other embodiments may practice the steps of method 700 using other components that perform similar functions.

The method 700 begins at step 702. At 702, the remotely monitored sound source information 305 is received (e.g., by the engaging device 201, via the network interface 206) from one or more remote devices 142. As described above with reference to FIG. 3, the remotely monitored sound source information 305 may include location information and an identifier (e.g. a textual description) for the monitored sound source.

At 704, the remotely monitored sound source information 305 is processed (e.g., by the sound source identification subsystem 310) to generate location information for each of the one or more remotely monitored sound sources (e.g., first sound source 102 in FIG. 1C, which is the television 412 in this example). The location information may include a direction, such as the television direction 413.

At 706, environmental audio information 301 is received (e.g., by the engaging device 201, via the network interface 206) from one or more microphones 140, 141, 142. The environmental audio information 301 may correspond to sounds originating from one or more unmonitored sound sources (e.g. dog 414 and coffee maker 416) and/or one or more monitored sound sources (e.g. television 412).

At 708, the environmental audio information 301 is processed (e.g., by the sound source identification subsystem 310) to generate location information for one or more unmonitored sound sources (e.g., dog 414 and coffee machine 416, both of which are unmonitored by a remote device 142 in this example). The location information for a given sound source may include a direction, such as the dog direction 415 or the coffee machine direction 417.

At 710, sound source user output 304 (such as a UI screen 600 or 650 or a spatial representation as shown in FIG. 4) is generated (e.g., by the sound source classification subsystem 320) identifying a plurality of sound sources (e.g., television 412, dog 414, and coffee machine 416). The sound source user output 304 may include the location information for one or more of the sound sources.

At 712, the sound source user output 304 is sent (e.g., by the engaging device 201, via the network interface 206, and mediated by the supporting device 220) to a user output device (such as a user output device 222 of the supporting device 220, e.g., display 224). As described above, more than one type or modality of user output may be included in the sound source user output 304, and it may be sent to more than one user output device (such as visual output to the display 224 and audio output to an audio output device). The sound source user output 304 may be presented to the user via the one or more user output devices, for example as screen 600 or 650 or a spatial representation as in FIG. 4.

At 714, user input 308 is received (e.g., by the engaging device 201, via the network interface 206 and mediated by the supporting device 220) from one or more user input devices, such as a pointing device 228, a touchscreen, a keyboard, and/or one or more other user input devices 226 of the supporting device 220, as described above with reference to FIGS. 5A through 6B. As described above, the user input 308 may include some or all of the information shown in the table 660 of FIG. 6C, such as updated values of one or more fields of one or more of the entries in the table 660 that reflect user input changing the values stored in the memory 208 of the engaging device 201. In some embodiments, the directional information from the pointing device (i.e., information indicating the pointing direction 502) may be included in the user input 308.

At 716, the user input 308 is processed generated (e.g., by the sound source classification subsystem 320) to designate a selected sound source (e.g., dog 414 or television 412) as a noise source. In some embodiments, the toggle switch 612 setting of each sound source entry may be included in the user input 308, for example as a binary value or yes/no value for a noise designation field 666 as shown in FIG. 6C. This information designating sound sources as being noise sources or as not being noise sources may be referred to as sound source designation information. In some embodiments, step 716 may comprise processing the directional information (generated by the pointing device) and the sound source designation information (i.e. the information in column 666 of table 660) to designate a selected sound source as a noise source, based on the direction of the selected sound source (e.g., based on a comparison of pointing direction 502, dog direction 415, television direction 413, and coffee maker direction 417).

At 718, sound source audio information 302 corresponding to sound originating from one or more active sound sources is received. For example, at a given time t, the engaging device 201 may receive sound source audio information 302 from one or more of the microphones 140, 141 of the ANC system 200, potentially including remotely monitored sound source audio information 307 from each remote device 142, with the sound source audio information 302 from each microphone 140, 141, 144 corresponding to a mix of sounds originating from one or more of the sound sources (e.g., 412, 414, 416) that are currently emitting sound, i.e. the active sound sources.

At 720, the sound source audio information 302 (and/or remotely monitored sound source audio information 307) is processed (e.g., by the sound source identification subsystem 310 to isolate sounds and by the noise cancellation subsystem 330 to generate anti-noise) to generate the noise cancellation signal 306, as described above.

At 722, the audio output signal 309 based on the noise cancellation signal 306 is generated (e.g., by the noise cancellation subsystem 330) and sent (e.g., by the engaging device 201, via an I/O interface 204) to the audio output device 205. As described above, the audio output signal 309 includes a noise cancellation component comprising the noise cancellation signal 306, which has signal characteristics (such as timing and amplitude) configured to cancel the sound from each active sound source designated as a noise source as the sounds originating from each such noise source arrives at the listener location 120.

Figure 8:
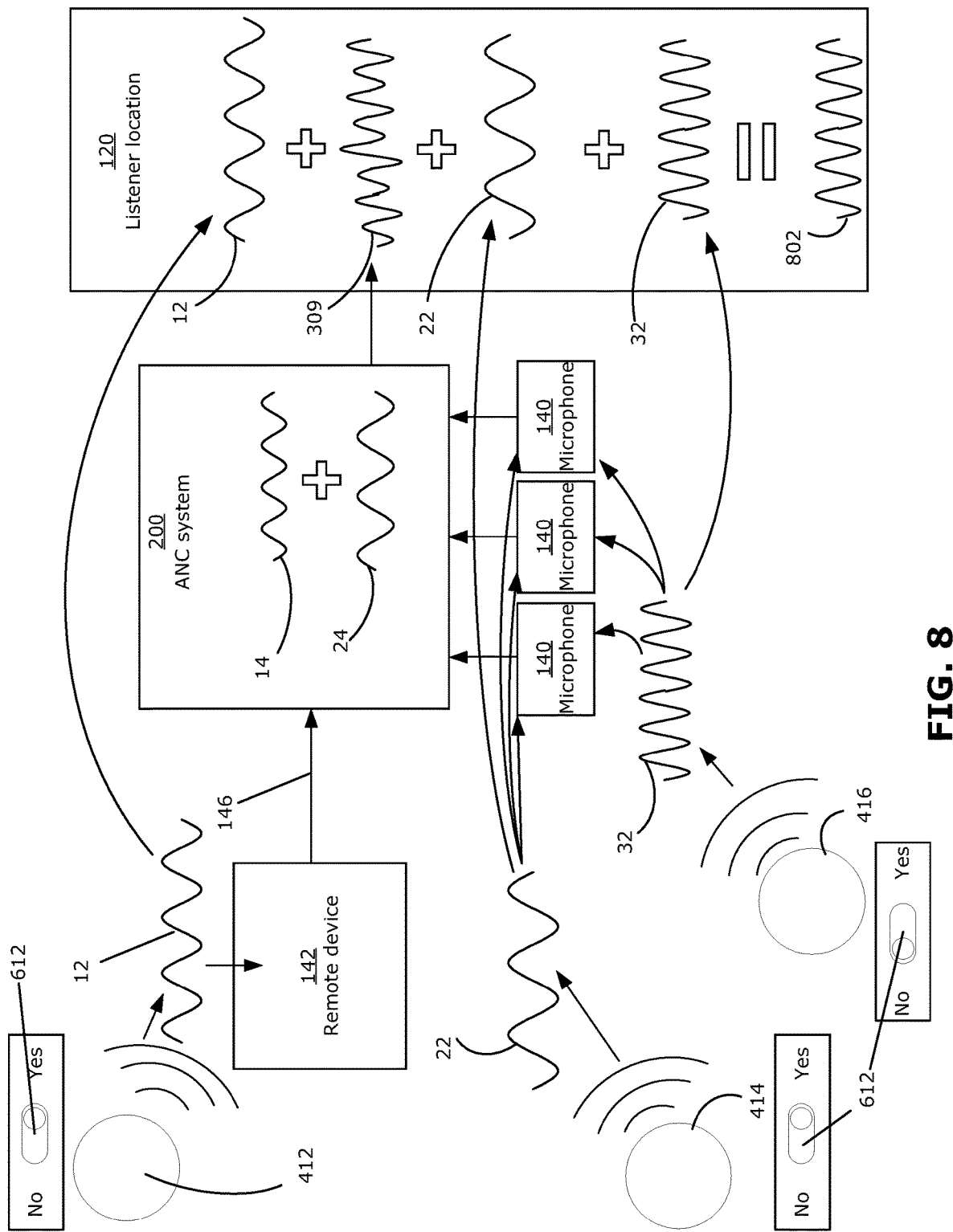
FIG. 8 is a block diagram of a simplified ANC system for cancelling noise from three sound sources using multiple microphones and a remote device, in accordance with examples described herein.

FIG. 8 is a modified version of FIG. 1C showing a further selective ANC system 200 configured to selectively cancel sound originating from some sound sources and not others, as described herein. Each sound source 102, 104, 106 is shown with its associated toggle switch 612 set to a Yes or No value: in this example, the first sound source 102 and second sound source 104 are designated as noise sources (i.e. their toggle switches 612 are set to "Yes"), whereas the third sound source 106 is not designated as a noise source (i.e. its toggle switch 612 is set to "No"). The ANC system

200 generates the audio output signal 309 to include an anti-noise signal configured to cancel the first sound 12 and second sound 22, but not the third sound 32; in this example, the audio output signal 309 is the noise cancellation signal 306. Accordingly, at the listener location, the first sound 12 and second sound 22 are cancelled by the audio output signal 309, resulting in a listener location sound signal 802 that is highly similar to the third sound 32 with little interference from noise sources.

Examples described herein may be used in a number of different contexts. Noise reduction is an important requirement for every audio or audiovisual call, such as phone calls or videoconference calls. Embodiments described herein may allow a user to select which noises he or she desires to cancel or mitigate, thereby providing better control of the auditory environment and a better call experience. In this example use case, the audio output signal 309 may be a mix of the noise cancellation signal 306 and the audio output from the call, and it may be presented to the listener with through headphones or a speaker. Furthermore, if a speaker is used as the audio output device 205, the quality of the call audio may be improved for remote participants as well, as the ambient environmental noises at the listener location 120 will be minimized for the microphone used to capture the voice of the speaker (i.e. the local listener) at the listener location 120.

Some embodiments may be used to improve in-person conversations. For example, the pointing device 228 (e.g. a mobile phone) may be used to "mute" sources of distracting noise in the environment during a conversation, including devices or other people making noise in the environment. In a crowded environment, a user may "mute" everyone other than the speaker to whom he or she wishes to attend. In a conference room environment, a single selective ANC system 200 may be used to improve sound quality for an entire group of listeners and speakers by eliminating directional noise from a particular source.

Some embodiments may be used to selectively cancel noises for both listening activities (e.g. listening to music, watching a movie) and for speaking activities (e.g. making an audio recording, participating in a conversation or conference call).

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for selectively cancelling sounds at a listener's location, comprising:
   generating sound source user output identifying a plurality of sound sources;
   processing a user input to designate a selected sound source of the plurality of sound sources as a noise source;
   receiving sound source audio information corresponding to sound originating from one or more sound sources of the plurality of sound sources, the one or more sound sources including the noise source;
   processing the sound source audio information to generate a noise cancellation signal configured to cancel, at the listener's location, sound originating from the noise source; and
   sending an audio output signal based on the noise cancellation signal to an audio output device for presentation to the listener.

2. The method of claim 1, further comprising:
   sending the sound source user output to a user output device; and
   receiving the user input from a user input device;
   wherein the sound source user output comprises, for each sound source of the plurality of sound sources, location information associated with the sound source.

3. The method of claim 2, wherein the location information comprises a direction of the sound source.

4. The method of claim 1, wherein processing the user input to designate a selected sound source of the plurality of sound sources as a noise source comprises:
   receiving directional information from a pointing device indicating a pointing direction;
   receiving sound source designation information from the user input device; and
   processing the directional information and the sound source designation information to designate a selected sound source as a noise source based on the direction of the selected sound source.

5. The method of claim 1,
   further comprising receiving, from a remote device, remotely monitored sound source information with respect to a remotely monitored sound source of the plurality of sound sources; and
   wherein the sound source user output identifies the remotely monitored sound source.

6. The method of claim 5, wherein the sound source audio information comprises remotely monitored sound source audio information received from the remote device corresponding to sound originating from the remotely monitored sound source.

7. The method of claim 5,
wherein the remotely monitored sound source information comprises remotely monitored sound source location data; and
further comprising processing the remotely monitored sound source location data to generate the location information associated with the remotely monitored sound source.

8. The method of claim 1,
further comprising receiving, from a microphone, environmental audio information comprising sound originating from an unmonitored sound source of the plurality of sound sources; and
wherein the sound source user output identifies the unmonitored sound source.

9. The method of claim 8, further comprising processing the environmental audio information to generate the location information associated with the unmonitored sound source.

10. A system for selectively cancelling sounds at a listener's location, comprising:
a processor device; and
a memory storing machine-executable instructions thereon which, when executed by the processing device, cause the system to:
generate sound source user output identifying a plurality of sound sources;
process a user input to designate a selected sound source of the plurality of sound sources as a noise source;
receive sound source audio information corresponding to sound originating from one or more sound sources of the plurality of sound sources, the one or more sound sources including the noise source;
process the sound source audio information to generate a noise cancellation signal configured to cancel, at the listener's location, sound originating from the noise source; and
send the an audio output signal based on the noise cancellation signal to an audio output device for presentation to the listener.

11. The system of claim 10, wherein:
the machine-executable instructions, when executed by the processing device, further cause the system to:
send the sound source user output to a user output device; and
receive the user input from a user input device; and
the sound source user output comprises, for each sound source of the plurality of sound sources, location information associated with the sound source.

12. The system of claim 11, wherein the location information comprises a direction of the sound source.

13. The system of claim 10,
further comprising a supplementary device comprising the user input device and the user output device, the user input device comprising a pointing device;
wherein processing the user input to designate a selected sound source of the plurality of sound sources as a noise source comprises:
receiving directional information from the pointing device indicating a pointing direction;
receiving sound source designation information from the user input device; and
processing the directional information and the sound source designation information to designate a selected sound source as a noise source based on the direction of the selected sound source.

14. The system of claim 10, wherein:
the machine-executable instructions, when executed by the processing device, further cause the system to receive, from a remote device, remotely monitored sound source information with respect to a remotely monitored sound source of the plurality of sound sources; and
the sound source user output identifies the remotely monitored sound source.

15. The system of claim 14, wherein the sound source audio information comprises remotely monitored sound source audio information received from the remote device corresponding to sound originating from the remotely monitored sound source.

16. The system of claim 14, wherein:
the remotely monitored sound source information comprises remotely monitored sound source location data; and
the machine-executable instructions, when executed by the processing device, further cause the system to process the remotely monitored sound source location data to generate the location information associated with the remotely monitored sound source.

17. The system of claim 10, wherein:
the machine-executable instructions, when executed by the processing device, further cause the system to receive, from a microphone, environmental audio information comprising sound originating from an unmonitored sound source of the plurality of sound sources; and
the sound source user output identifies the unmonitored sound source.

18. The system of claim 17, wherein the machine-executable instructions, when executed by the processing device, further cause the system to process the environmental audio information to generate the location information associated with the unmonitored sound source.

19. The system of claim 17, further comprising:
the user input device;
the user output device;
the microphone; and
a remote device comprising a remote device microphone, the remote device being configured to:
send, to the system, remotely monitored sound source information with respect to a remotely monitored sound source of the plurality of sound sources;
obtain, from the remote device microphone, remotely monitored sound source audio information corresponding to sound originating from the remotely monitored sound source; and
send, to the system, the remotely monitored sound source audio information;
wherein:
the sound source user output identifies the remotely monitored sound source; and
the sound source audio information comprises the remotely monitored sound source audio information.

20. A non-transitory computer-readable medium having machine-executable instructions stored thereon which, when executed by a computer, cause the computer to carry out the method of claim 1.

\* \* \* \* \*